（12）United States Patent
Chiu et al.

(10) Patent No.: US 11,248,974 B2
(45) Date of Patent: Feb. 15, 2022

(54) MULTICAVITY PRESSURE SENSOR

(71) Applicant: Apple Inc., Cupertino, CA (US)

(72) Inventors: Jeffrey C. Chiu, San Francisco, CA (US); Krishna Prasad Vummidi Murali, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 16/806,325

(22) Filed: Mar. 2, 2020

(65) Prior Publication Data

US 2021/0270687 A1      Sep. 2, 2021

(51) Int. Cl.
 G01L 9/00      (2006.01)
(52) U.S. Cl.
 CPC .......... G01L 9/0042 (2013.01); G01L 9/0072 (2013.01)
(58) Field of Classification Search
 None
 See application file for complete search history.

(56) References Cited

U.S. PATENT DOCUMENTS

| | | | | |
|---|---|---|---|---|
| 6,352,874 B1* | 3/2002 | McNeil | ................ | G01L 9/0042 438/251 |
| 6,861,276 B2* | 3/2005 | Kurtz | ..................... | H01L 29/84 257/E29.324 |
| 7,258,018 B2* | 8/2007 | Kurtz | .................... | G01L 9/0042 73/715 |
| 8,445,324 B2* | 5/2013 | Qu | ...................... | B81C 1/00952 438/110 |
| 2018/0038754 A1* | 2/2018 | Marsh | .................. | G01L 9/0073 |

* cited by examiner

*Primary Examiner* — Andre J Allen
*Assistant Examiner* — Jermaine L Jenkins
(74) *Attorney, Agent, or Firm* — Morgan, Lewis & Bockius LLP

(57) ABSTRACT

Aspects of the subject technology relate to an apparatus including multiple cavities disposed adjacent to one another in a housing structure. The apparatus further includes a number of membranes, with each membrane disposed over a cavity to seal the cavity, and a sensor that can sense a deflection of a respective membrane associated with one of the cavities in response to an applied pressure. Each membrane is operable within a respective pressure range, and the applied pressure is within an operating range of the respective membrane.

20 Claims, 7 Drawing Sheets

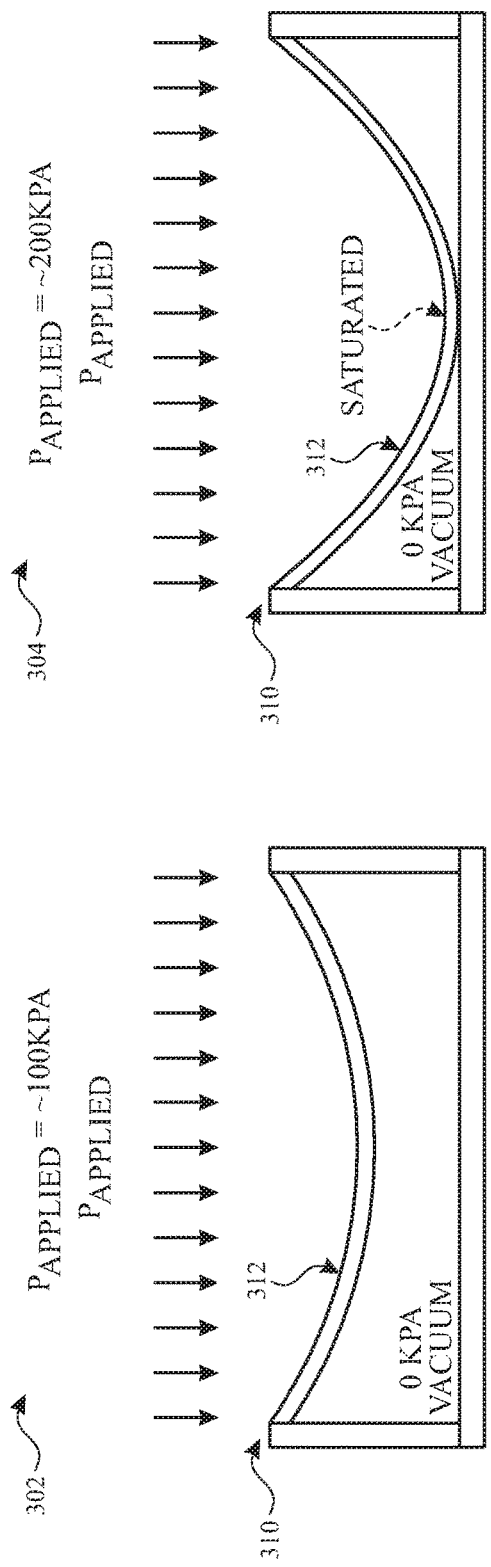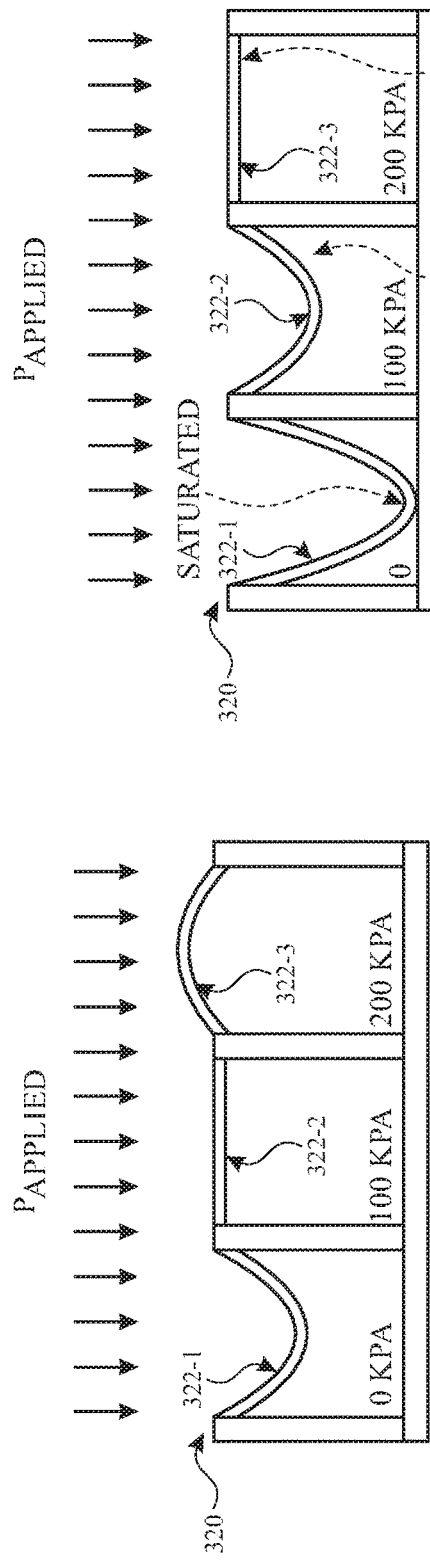
FIG. 3A
FIG. 3B

MULTICAVITY PRESSURE SENSOR

TECHNICAL FIELD

The present description relates generally to sensor technology, and, more particularly, but not exclusively, to a multicavity pressure sensor.

BACKGROUND

Portable electronic devices such as smartphones and smartwatches include a pressure sensor for perceiving environmental pressure. The pressure sensor is sometimes used for barometric pressure measurements, which can be used to identify changes in elevation or depth in water. The changes in elevation are sometimes used to identify a location or exercise performed by a user of the device. For example, an activity monitor application running on processing circuitry of the device, worn or carried by the user while the user walks or runs up a flight of stairs or up a hill, may measure elevation changes. Portable electronic devices most commonly use capacitive or piezo-resistive micro-electromechanical system (MEMS) pressure sensors.

MEMS pressure sensors used in consumer electronic devices are operational within a defined pressure range (e.g., 30 kPa-110 kPa). MEMS pressure sensors typically rely on a diaphragm that deflects to detect pressure change. The performance of the sensor is dependent on the sensor's linearity. The linearity of the sensor decreases as the diaphragm deflection increases. Typical MEMS pressure sensors have a single diaphragm and a single sealed cavity, which is typically at a vacuum pressure.

BRIEF DESCRIPTION OF THE DRAWINGS

Certain features of the subject technology are set forth in the appended claims. However, for purpose of explanation, several embodiments of the subject technology are set forth in the following figures.

FIGS. 3A, 3B and 3C are schematic diagrams illustrating functionality comparison scenarios of a single-cavity pressure sensor with an example of a multicavity pressure sensor apparatus of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description, which includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

The pressure sensor apparatus of the subject technology includes multiple diaphragms and multiple sealed cavities at different pressures. The disclosed multicavity pressure sensor apparatus is featured with an increased operating range as well as an improved linearity performance. Typical micro-electromechanical system (MEMS) pressure sensors have a single diaphragm and a single sealed cavity, which is typically at vacuum pressure and can operate in a limited pressure range. When the ambient pressure exceeds the pressure range, the single-cavity sensor is saturated and no longer measures pressures exceeding the saturation pressure. With the multicavity pressure sensor apparatus of the subject technology, different cavities are designed for different operating pressures, so that when the diaphragm of a vacuum cavity is saturated, the diaphragms of the remaining cavities are still in their operating ranges.

Pressure sensors are known to have linear responses for small diaphragm deflections. As the applied pressure is significantly higher than the cavity pressure, nonlinearity in diaphragm deflection occurs, resulting in a nonlinearity error in pressure measurement. In the multicavity pressure sensor apparatus of the subject technology, the applied pressure is sensed via a membrane of a cavity of the multiple cavities that is operating within its linear pressure range. The disclosed multicavity pressure sensor apparatus includes a number of (e.g., two or more) cavities, each cavity having a membrane attached to a respective sensor (e.g., capacitive or piezo-resistive sensor) and is capable of measuring a portion of a larger pressure range of the multicavity pressure sensor apparatus. The multicavity pressure sensor apparatus of the subject technology can be used in a number of applications, including mountain climbing and underwater diving. The subject multicavity pressure sensor apparatus can provide a more accurate and higher resolution pressure reading due to linearity at multiple operating points, and can guarantee performance at multiple altitudes or at different depths of water.

Figure 1:
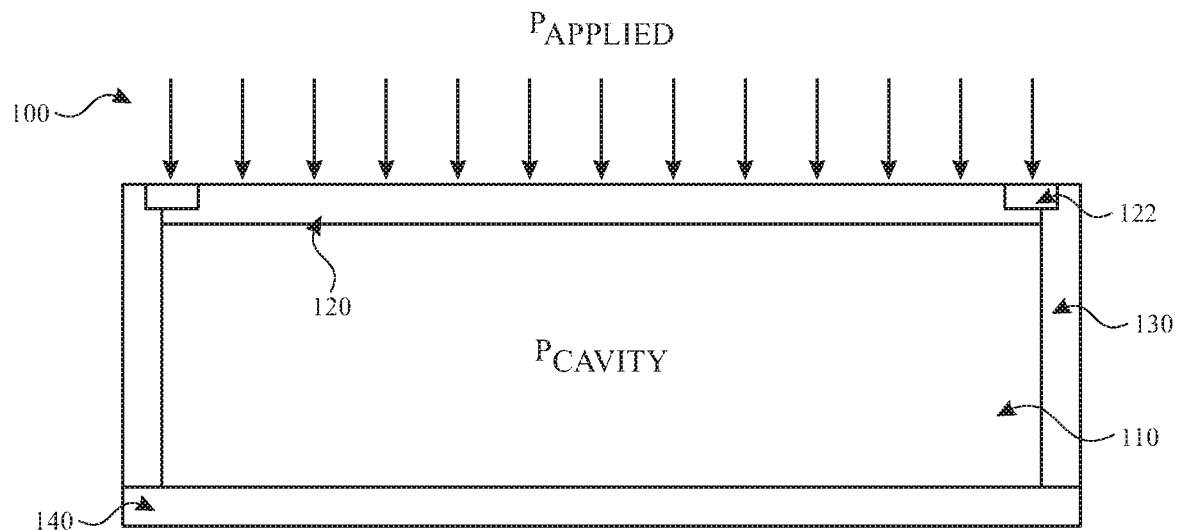
FIG. 1 is a schematic diagram illustrating an example of a single-cavity pressure sensor apparatus, in accordance with various aspects of the subject technology.

FIG. 1 is a schematic diagram illustrating an example of a single-cavity pressure sensor apparatus 100, in accordance with various aspects of the subject technology. The single-cavity pressure sensor apparatus 100 (hereinafter, "apparatus 100") is a MEMS pressure sensor and includes a cavity 110 covered and sealed by a membrane (diaphragm) 120. The cavity 110 is sealed at a preset pressure, $P_{cavity}$, which can be zero kPa or any other preset pressure. The pressure ($P_{applied}$) is applied to the top surface of the membrane 120, which causes a deflection of the membrane 120. While $P_{applied}$ is within an operating pressure range of the membrane 120, the deflection would be proportional to the applied pressure.

In case $P_{applied}$ is significantly larger than $P_{cavity}$, the membrane 120 may saturate, resulting in nonproportionality of the deflection to the applied pressure. For applied pressures significantly larger than $P_{cavity}$, the membrane 120 will be operating in a nonlinear region and the apparatus 100 shows less sensitivity to the applied pressure. The cavity 110 is surrounded by walls 130 and a bottom 140.

The apparatus 100 can be a piezo-resistive pressure sensor or a capacitive pressure sensor. In the case of piezo-resistive pressure sensing, the apparatus 100 includes sensors (piezo-sensor elements) 122 that are attached at a number of (e.g., four) edges of the membrane 120. The sensors 122 perceive a deflection of the membrane 120, which is proportional to the applied pressure ($P_{applied}$), as long as $P_{applied}$ is within the linear operating range of the membrane 120, as described above. For operation as a capacitive pressure sensor, the internal surfaces of the membrane 120 and the bottom 140 would be coated with an electrically conductive material (e.g., aluminum, copper, silver, tungsten) to form electrodes of a capacitive element, having the cavity gas (e.g., air) working as the dielectic layer of the capacitive element. The change in deflection of the membrane 120 can alter a capacitance of the capacitive element, which can be measured via an electronic circuit.

The ambient temperature can increase while the ambient pressure is remaining constant outside the apparatus 100, causing the pressure buildup inside the cavity 110. In some implementations, a pressure-relief valve can be added (not shown for simplicity) as part of the structure of the pressurized cavity (e.g., 110) to prevent pressure buildup in the cavity 110 due to temperature increase. The pressure buildup can cause false pressure readings. The goal of the pressure-relief valve is to make sure the pressure inside the cavity 110 remains constant and does not increase beyond a predetermined value. The pressure of the cavity 110 can also be calibrated across a pressure-temperature region of interest.

Figure 2:
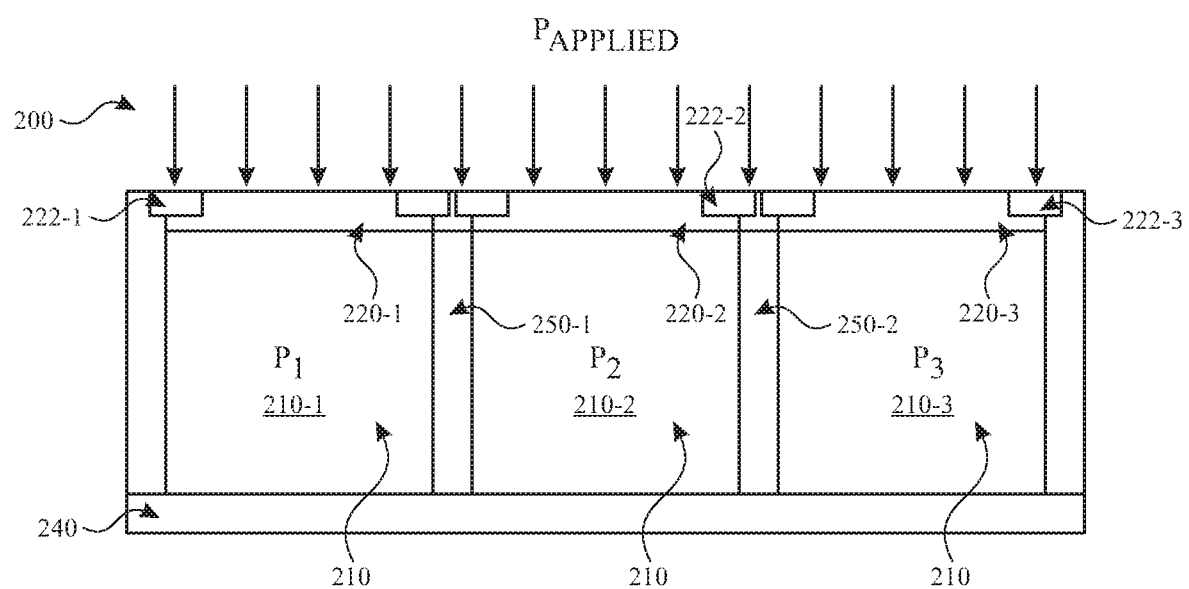
FIG. 2 is a schematic diagram illustrating an example of a multicavity pressure sensor apparatus, in accordance with various aspects of the subject technology.

FIG. 2 is a schematic diagram illustrating an example of a multicavity pressure sensor apparatus 200, in accordance with various aspects of the subject technology. The multicavity pressure sensor apparatus 200 (hereinafter, "apparatus 200") is a MEMS pressure sensor with dimensions of a few millimeters and includes multiple (e.g., two or more) cavities 210 (210-1, 210,2 and 210-3). The cavities 210 are covered and sealed by membranes (diaphragm) 220 (220-1, 220-2 and 220-3). The cavities 210-1, 210-2 and 210-3 are sealed at different (unequal) preset pressures $P_1$, $P_2$ and $P_3$, which can be zero kPa or any other preset pressure. The cavities 210 are disposed adjacent to one another in a housing structure that can be, for example, a semiconductor substrate. In some implementations, the semiconductor is silicon such as p-doped silicon substrate and the cavities 210 are created in the p-doped silicon substrate using a silicon-etch procedure (e.g., a wet or dry etch).

The membranes 220 can be, for example, a porous silicon membrane built with a thickness ranging from 2 μm to 100 μm. In some implementations, the membranes 220 can be made of silicon nitride (SiN). The pressure ($P_{applied}$) is applied to the top surface of the membranes 220, which can cause a deflection of one of the membrane 220. While $P_{applied}$ is within an operating pressure range of any of the membranes 220, the respective deflection would be approximately proportional to the applied pressure. Attached to the membranes 220 (220-1, 220-2 and 220-3) are sensors that are piezo-resistive elements 222 (222-1, 222-2 and 222-3). The sensor 222 can perceive deflections of the respective membranes 220 and provide an electrical signal for processing by an electronic circuit.

In some implementations, internal surfaces of the membranes 220 and bottoms 240 of the cavities 210 are covered with an electrically conductive material (e.g., aluminum, copper, silver, tungsten) to form electrodes of respective capacitive elements. The change in deflection of the membranes 220 can alter a capacitance of the respective capacitive elements, which can be measured via the electronic circuit. The electronic circuit may, for example, be implemented as part of the electronic circuitry of a host device such as a smartwatch or a smartphone.

An important feature of the apparatus 200 is that the three pressure sensors formed by the cavities 210 and membranes 220 can be used as a wide range pressure sensor that can measure an applied pressure ranging from 0 kPa to about 300 kPa. Currently, a number of pressure sensors are needed to measure pressures in such a wide range with a good pressure resolution. In some implementations, the preset pressures $P_1$, $P_2$ and $P_3$ of the cavities 210-1, 210-2 and 210-3 can be, for example, 0 kPa, 100 kPa and 200 kPa. In this case, the apparatus 200 can measure pressures within 0 kPa to 300 kPa. For instance, the membranes 220-1, 220-2 and 220-3 can respond to applied pressures within 0 kPa to 100 kPa, 100 kPa to 200 kPa and 200 kPa to 300 kPa, respectively. The number of pressurized cavities and cavity pressures $P_1$, $P_2$, ... $P_N$ in the sensor can be chosen based on the intended application of the sensor.

As discussed above with respect to FIG. 1, pressure-relief valves can be added (not shown for simplicity) as part of the structures of the pressurized cavities (e.g., 210) to prevent pressure buildup in the cavities 210 due to temperature increase. The pressure buildup can cause false pressure readings. The goal of the pressure-relief valve is to make sure the pressure inside the cavities 210 remains constant and does not increase beyond predetermined values. The pressures of the cavities 210 can also be calibrated across a pressure-temperature region of interest.

Figure 3C:
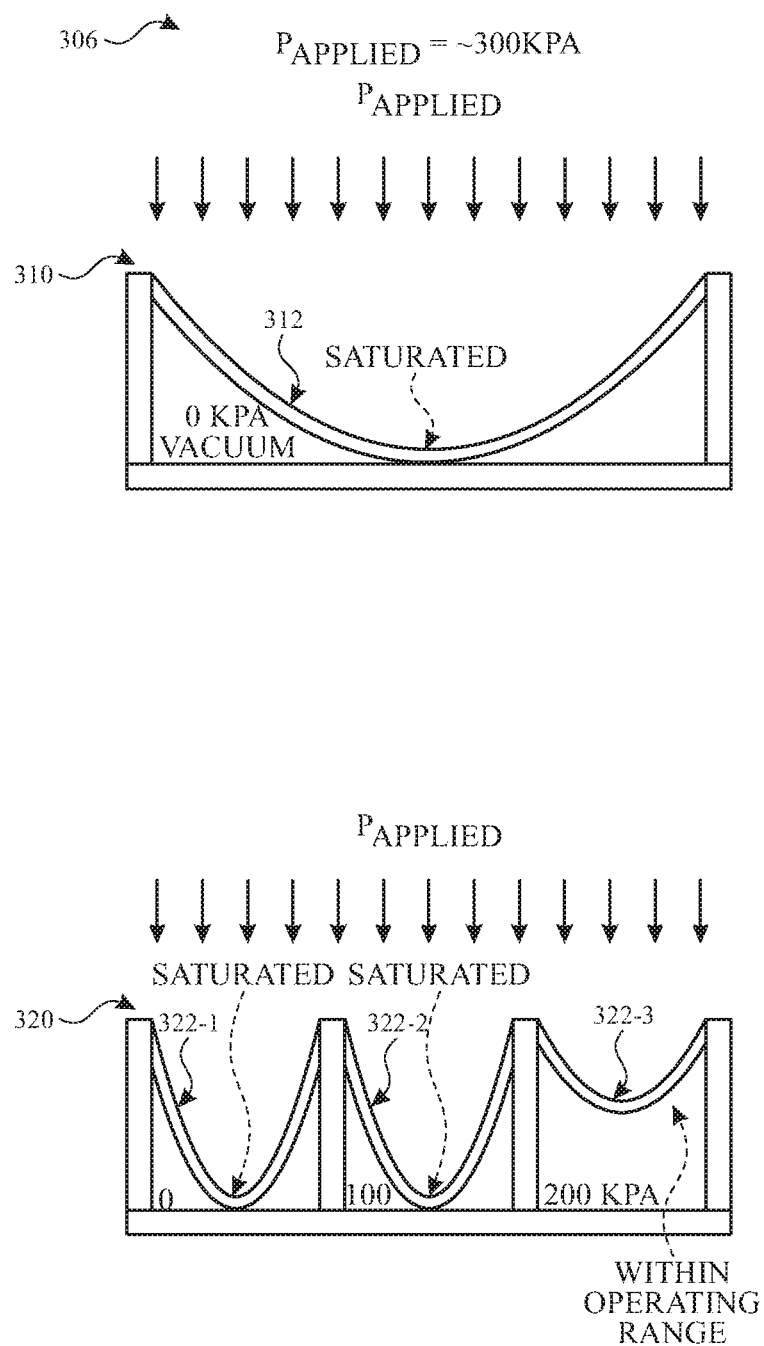

FIGS. 3A, 3B and 3C are schematic diagrams illustrating functionality comparison scenarios 302, 304 and 306 of a single-cavity pressure sensor apparatus 310 with an example of a multicavity pressure sensor 320 of the subject technology. The functionality comparison scenarios 302, 304 and 306 of FIGS. 3A, 3B and 3C are for three values of applied pressure ($P_{applied}$), for which the single-cavity pressure sensors 310 and the multicavity pressure sensors 320 are used. The cavities of the single-cavity pressure sensors 310 are preset at zero kPa.

FIG. 3A depicts a first scenario 302, where the applied pressure ($P_{applied}$) is within 0 kPa to 100 kPa, and is applied to the single-cavity pressure sensors 310 and the multicavity pressure sensors 320. The operating pressure range of the single-cavity pressure sensors 310 is zero kPa to about 100 kPa. Therefore, at the applied pressure of 0 kPa to 100 kPa, the membrane 312 is deflected within its linear operating range and the applied pressure is correctly measured. The multicavity pressure sensors 320 have three cavities preset at pressures of zero kPa, 100 kPa and 200 kPa, respectively. For applied pressures within the range of 0 kPa to 100 kPa, cavity 1 and cavity 2 produce most of the signal, while the membranes 322-1 and 322-2 being in linear deflection regime at 100 kPa (positive and negative deflection).

FIG. 3B depicts a second scenario 304, where the applied pressure ($P_{applied}$) is within the range of 100 kPa to 200 kPa, which is applied to the single-cavity pressure sensors 310 and the multicavity pressure sensors 320. The operating pressure range of the single-cavity pressure sensors 310 is zero kPa to about 100 kPa. Therefore, at the applied pressure of 200 kPa the membrane 312 has larger deflection and the linear approximation cannot be valid anymore. For the applied pressure within the range of 100 kPa to 200 kPa in the scenario 304, the membrane 322-1 is saturated, but the membranes 322-2 and 322-3 are operating within their linear operating range and are responsible for most of the signal resulting from the applied pressure.

FIG. 3C depicts a third scenario 306, where the applied pressure ($P_{applied}$) is within a range of 200 kPa to 300 kPa, which is applied to the single-cavity pressure sensors 310 and the multicavity pressure sensors 320. The operating pressure range of the single-cavity pressure sensors 310 is zero kPa to about 100 kPa. Therefore, at the applied pressure of 200-300 kPa, the membrane 312 has larger deflection and the linear approximation cannot not be valid anymore. For the applied pressure of 200 kPa to 300 kPa in the scenario 306, the membranes 322-1 and 322-1 are saturated, but the membrane 322-3 is operating within its linear operating range and produces most of the signal. The comparison scenarios 302, 304 and 306 discussed above clearly illustrate the important wide pressure-measuring range of the multicavity pressure sensors 320 of the subject technology, as compared to a single-cavity pressure sensor.

Figure 4:
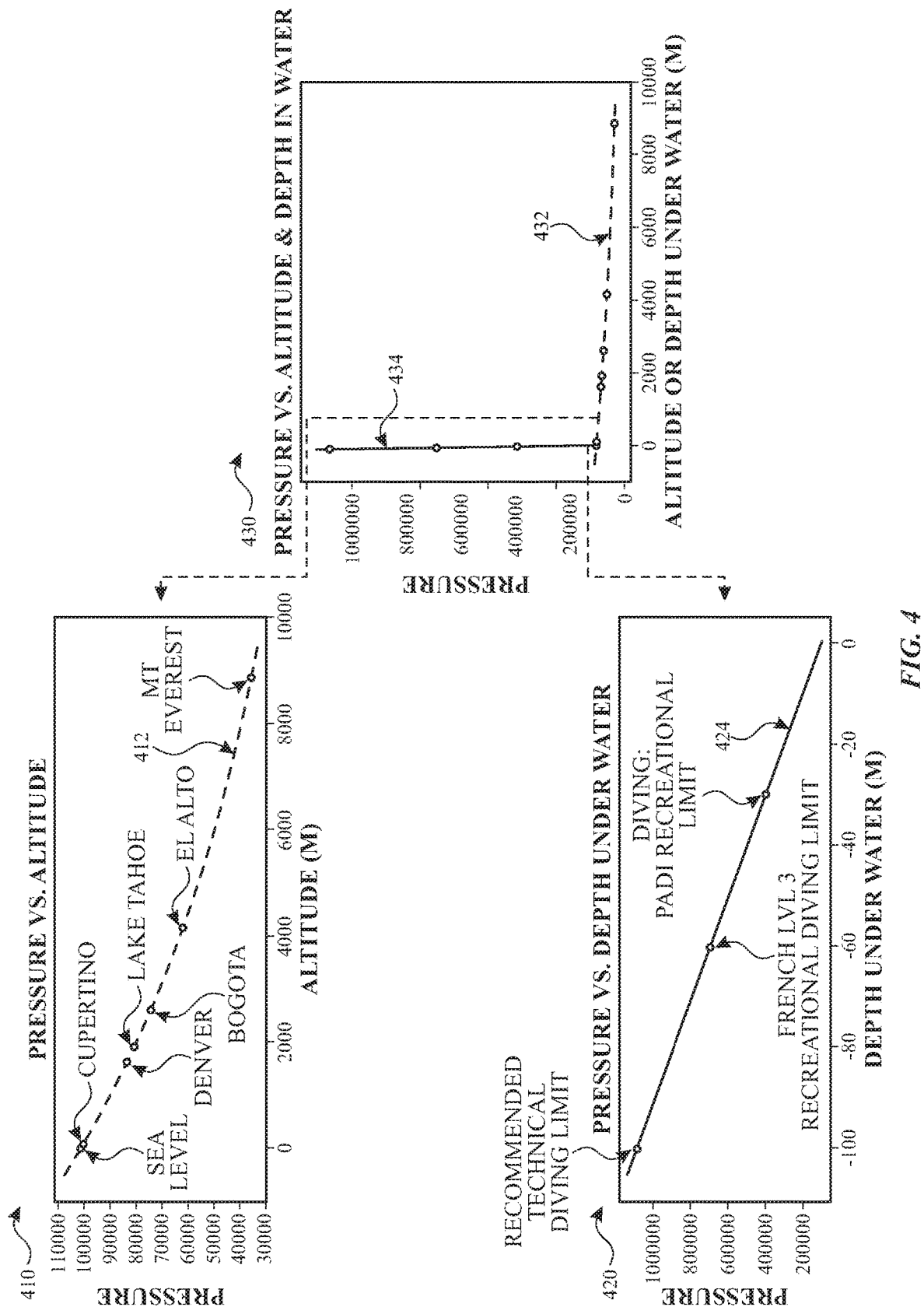
FIG. 4 illustrates charts of examples of pressure points of interest that can be measured with a multicavity pressure sensor apparatus of the subject technology.

FIG. 4 illustrates charts 410, 420 and 430 of examples of pressure points of interest that can be measured with a multicavity pressure sensor apparatus of the subject technology. The chart 410 depicts a plot 412 of a variation of pressure (in Pascals) versus altitude (in meters). On the plot 412, pressures corresponding to a number of example points of interest, including sea level, Mount Everest and a few cities, are shown. The plot 412 shows that the multicavity pressure sensor apparatus of the subject technology (e.g., 200 of FIG. 2) can be used in various altitudes from sea level to the height of Mount Everest.

The chart 420 depicts a plot 424 of a variation of pressure (in Pascals) versus depth in water (in meters). On the plot 424, pressures corresponding to a number of example depths of interest in water, including a recommended technical diving limit and a professional association of diving instructors (PADI) recreation level, are shown. The plot 424 shows that the multicavity pressure sensor apparatus of the subject technology (e.g., 200 of FIG. 2) can be used in various depths of interest for professional and recreational diving.

The chart 430 depicts plots 432 and 434 of a variation of pressure (in Pascals) versus altitude and depth in water (in meters), respectively. With the pressure range of 0 to 100 kPa and altitude range of 0 to 10,000 m of the chart 430, the plot 432 that corresponds to the plot 412 has much less slope and the plot 434 that corresponds to the plot 424 is almost a vertical line. Therefore, the multicavity sensor of the subject technology enables measuring the entire range of altitudes and water depths of interest by using a single pressure sensor.

Figure 5:
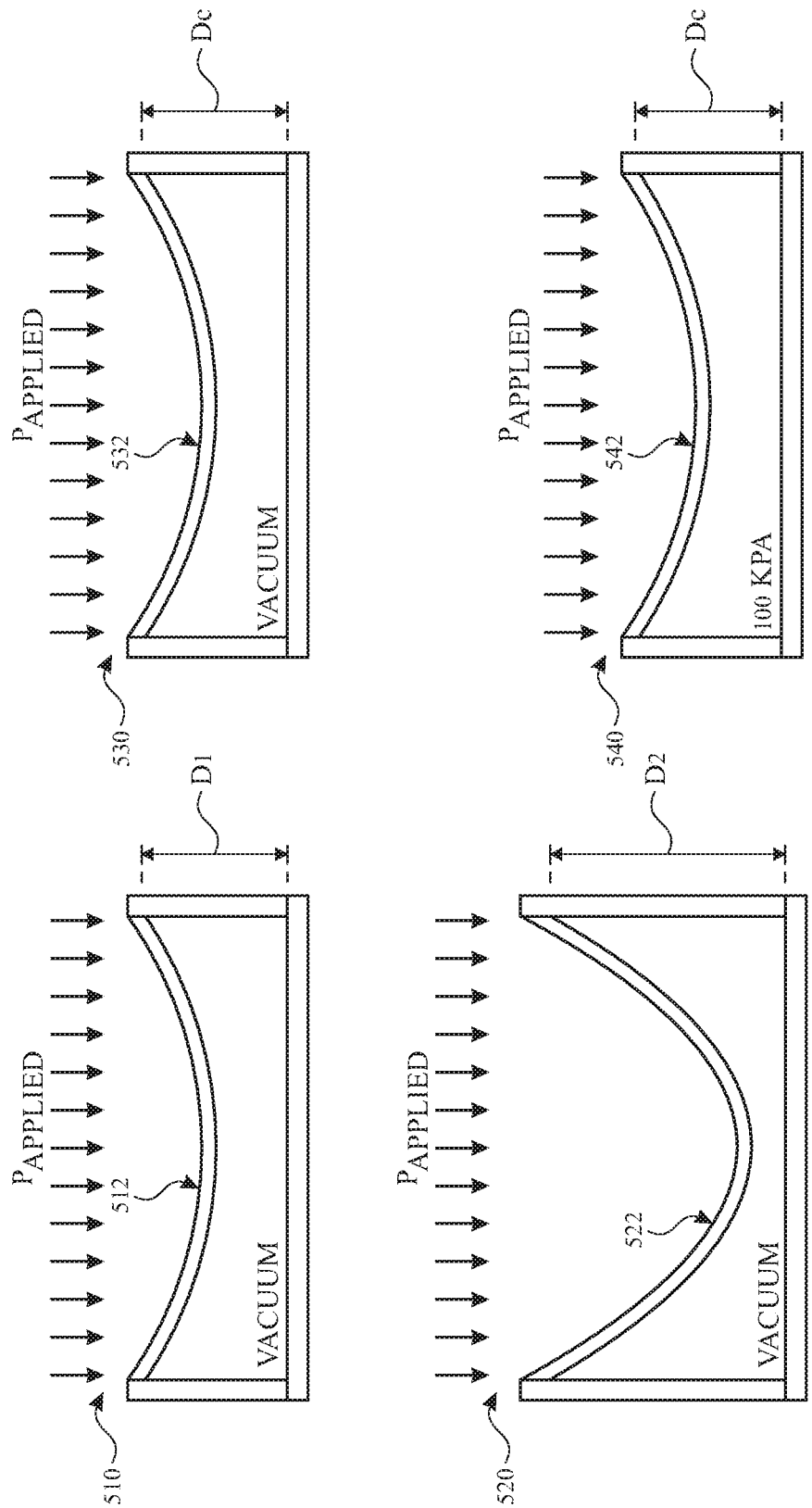
FIG. 5 is a schematic diagram illustrating cavity pressure versus a cavity gap-size comparison of an example of a single-cavity pressure sensor apparatus.

FIG. 5 is a schematic diagram illustrating cavity pressure versus a cavity gap-size comparison of an example single-cavity pressure sensor apparatus. The single-cavity pressure sensor apparatus (hereinafter, "apparatus") 510, 520, 530 and 540, shown in FIG. 5, are structurally somewhat different as described herein. The apparatus 510 has a vacuum cavity and a gap size of D1, which is compared with the apparatus 520 with a vacuum cavity and a gap size of D2, which is larger than D1. The properties (e.g., material of the membranes) 512 and 522 may need to be different due to the larger deflection of the membrane 532. The apparatus 530 has a vacuum cavity and a gap size of Dc, which is compared with the apparatus 540 with a cavity pressure of 100 kPa and a gap size of Dc. The properties (e.g., material and thickness) of the membranes 532 and 542 may be similar.

The idea of FIG. 5 is to discuss whether using a larger gap size (apparatus 520) can be used instead of using two cavities with different preset pressures (apparatuses 530 and 540). In this regard, it is noted that for the apparatus 520, the large deflection of the membrane 522 may result in high stresses in the membrane. If the membrane 522 is thin, the stresses can be a limiting factor resulting in mechanical failure. If the membrane 522 is thick, the membrane deflection would be small, resulting in a small pressure signal at low pressures (e.g., about 30 kPa). In the case of a capacitive pressure sensor, the large deflection of the membrane 522 can result in a nonlinear response. Moreover, the large deflection in the case of membrane 522 can impose a constraint on an analog-to-digital converter (ADC) of the signal processing ASIC, which has a limited quantization, and enlarging its range can reduce the available resolution of the ADC.

Figure 6:
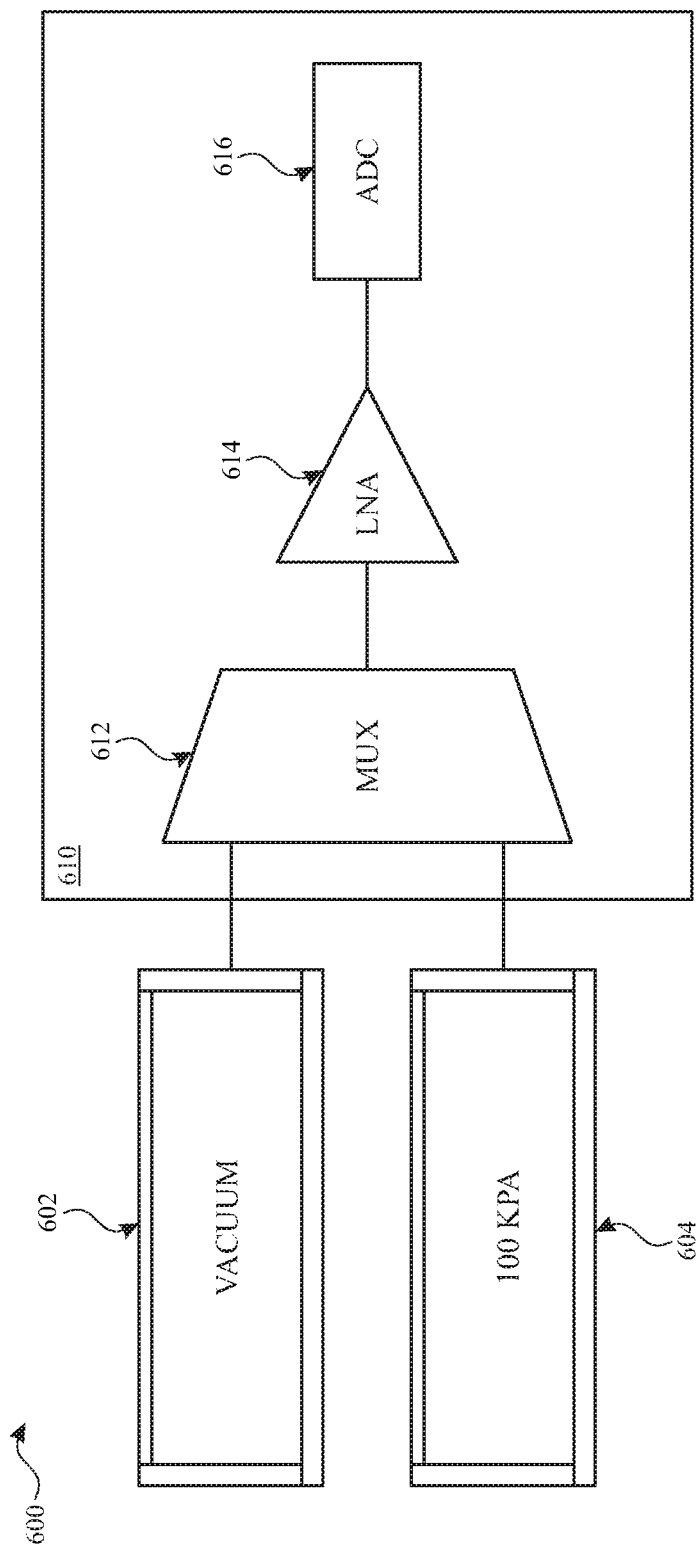
FIG. 6 illustrates a schematic diagram showing a multicavity pressure sensor apparatus including an electronic circuit for signal processing, in accordance with various aspects of the subject technology.

FIG. 6 illustrates a schematic diagram showing a multicavity pressure sensor apparatus 600 including an electronic circuit for signal processing, in accordance with various aspects of the subject technology. The multicavity pressure sensor apparatus 600 (hereinafter, "apparatus 600") includes two cavities 602 and 604 and an electronic circuit (e.g., an ASIC) 610. The cavities 602 and 604 are at preset pressures of zero kPa (vacuum) and 100 kPa, respectively. In some implementations, the number of cavities of the apparatus 600 can be more than two. The electronic circuit 610 includes a multiplexer (MUX) 612, a low-noise amplifier (LNA) and an ADC. The MUX 612 is used to selectively connect a pressure signal of one of the cavities 602 and 604 (e.g., from respective piezo-resistive or capacitive sensors) to the LNA 614, which amplifies and conditions the pressure signal for the ADC 616. The ADC 616 converts the amplified pressure signal to a digital signal that can be further processed by a processor, for example, a processor of a host device such as a smartphone or a smartwatch.

Figure 7:
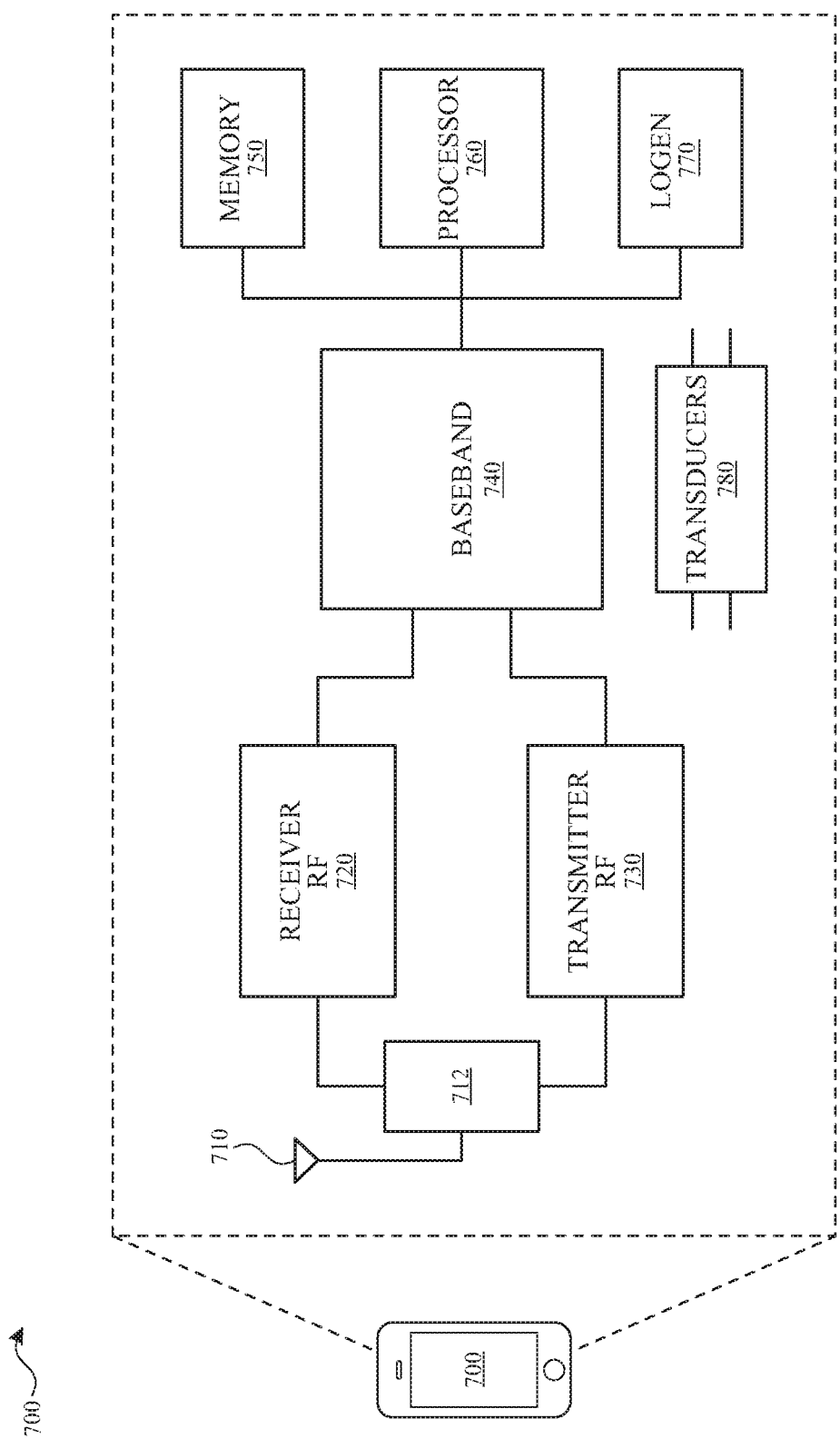
FIG. 7 illustrates a wireless communication device in which aspects of subject technology are implemented.

FIG. 7 illustrates a wireless communication device in which aspects of subject technology are implemented. In one or more implementations, the wireless communication device 700 can be a smartphone or a smartwatch that hosts an apparatus of the subject technology, for example, for pressure, elevation and depth in water measurements. The wireless communication device 700 may comprise a radio-frequency (RF) antenna 710, a duplexer 712, a receiver 720, a transmitter 730, a baseband processing module 740, a memory 750, a processor 760, a local oscillator generator (LOGEN) 770 and one or more transducers 780. In various embodiments of the subject technology, one or more of the blocks represented in FIG. 7 may be integrated on one or more semiconductor substrates. For example, the blocks 720-770 may be realized in a single chip or a single system on a chip, or may be realized in a multichip chipset.

The receiver 720 may comprise suitable logic circuitry and/or code that may be operable to receive and process signals from the RF antenna 710. The receiver 720 may, for example, be operable to amplify and/or down-convert received wireless signals. In various embodiments of the subject technology, the receiver 720 may be operable to cancel noise in received signals and may be linear over a wide range of frequencies. In this manner, the receiver 720 may be suitable for receiving signals in accordance with a variety of wireless standards, Wi-Fi, WiMAX, Bluetooth, and various cellular standards.

The transmitter 730 may comprise suitable logic circuitry and/or code that may be operable to process and transmit signals from the RF antenna 710. The transmitter 730 may, for example, be operable to up-convert baseband signals to RF signals and amplify RF signals. In various embodiments of the subject technology, the transmitter 730 may be operable to up-convert and amplify baseband signals processed in accordance with a variety of wireless standards.

Examples of such standards may include Wi-Fi, WiMAX, Bluetooth, and various cellular standards. In various embodiments of the subject technology, the transmitter 730 may be operable to provide signals for further amplification by one or more power amplifiers.

The duplexer 712 may provide isolation in the transmit band to avoid saturation of the receiver 720 or damaging parts of the receiver 720, and to relax one or more design requirements of the receiver 720. Furthermore, the duplexer 712 may attenuate the noise in the receiver band. The duplexer 712 may be operable in multiple frequency bands of various wireless standards.

The baseband processing module 740 may comprise suitable logic, circuitry, interfaces, and/or code that may be operable to perform processing of baseband signals. The baseband processing module 740 may, for example, analyze received signals and generate control and/or feedback signals for configuring various components of the wireless communication device 700, such as the receiver 720. The baseband processing module 740 may be operable to encode, decode, transcode, modulate, demodulate, encrypt, decrypt, scramble, descramble, and/or otherwise process data in accordance with one or more wireless standards.

The processor 760 may comprise suitable logic, circuitry, and/or code that may enable processing data and/or controlling operations of the wireless communication device 700. In this regard, the processor 760 may be enabled to provide control signals to various other portions of the wireless communication device 700. The processor 760 may also control transfer of data between various portions of the wireless communication device 700. Additionally, the processor 760 may enable implementation of an operating system or otherwise execute code to manage operations of the wireless communication device 700.

The memory 750 may comprise suitable logic, circuitry, and/or code that may enable storage of various types of information such as received data, generated data, code, and/or configuration information. The memory 750 may comprise, for example, RAM, ROM, flash, and/or magnetic storage. In various embodiments of the subject technology, information stored in the memory 750 may be utilized for configuring the receiver 720 and/or the baseband processing module 740.

The LOGEN 770 may comprise suitable logic, circuitry, interfaces, and/or code that may be operable to generate one or more oscillating signals of one or more frequencies. The LOGEN 770 may be operable to generate digital and/or analog signals. In this manner, the LOGEN 770 may be operable to generate one or more clock signals and/or sinusoidal signals. Characteristics of the oscillating signals such as the frequency and duty cycle may be determined based on one or more control signals from, for example, the processor 760 and/or the baseband processing module 740.

In operation, the processor 760 may configure the various components of the wireless communication device 700 based on a wireless standard according to which it is desired to receive signals. Wireless signals may be received via the RF antenna 710, amplified, and down-converted by the receiver 720. The baseband processing module 740 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 750, and/or information affecting and/or enabling operation of the wireless communication device 700. The baseband processing module 740 may modulate, encode, and perform other processing on audio, video, and/or control signals to be transmitted by the transmitter 730 in accordance with various wireless standards.

The one or more transducers 780 may include miniature transducers such as the multicavity pressure sensor of the subject technology (e.g., 200 of FIG. 2) that is capable of measuring a long range of pressures, as described above. The multicavity pressure sensor of the subject technology is a miniature device that can readily be integrated with the one or more transducers 780. In one or more implementations, the processor 760 can process signals from the one or more transducers 780, to determine environmental parameters such as pressure as well as elevation and depth in water, and so on.

In accordance with various aspects of the subject disclosure, an apparatus is disclosed that includes multiple cavities disposed adjacent to one another in a housing structure. The apparatus further includes a number of membranes, each membrane disposed over a cavity to seal the cavity, and a sensor that can sense a deflection of a respective membrane associated with one of the cavities in response to an applied pressure. Each membrane is operable within a respective pressure range, and the sensed applied pressure is within an operating range of the respective membrane.

In accordance with other aspects of the subject disclosure, an electronic device is provided that includes a multicavity pressure sensor, and an electronic circuit. The multicavity pressure sensor includes multiple cavities created in a single substrate, and multiple membranes. Each membrane is operable within a respective pressure range and is disposed over a cavity to seal the cavity. A sensor senses a deflection of a respective membrane associated with one of the cavities in response to an applied pressure. The sensed applied pressure is within a linear region of operation of the respective membrane. The electronic circuit can be an application-specific integrated circuit (ASIC) that processes pressure signals from the sensor.

In accordance with other aspects of the subject disclosure, a wireless communication device consists of one or more transducers including a pressure sensor and a processor. The processor can control operations of the transducers and can process pressure sensor signals from the pressure sensor. The pressure sensor includes a number of cavities disposed adjacent to one another in a semiconductor substrate. The pressure sensor further includes a number of membranes disposed over the cavities to seal the cavities, and a sensor to perceive a deflection of a respective membrane associated with one of the cavities in response to an applied pressure. Each membrane is operable within a respective linear pressure region. The sensed applied pressure is within a respective linear pressure region of the respective membrane, and the cavities are sealed at unequal internal pressures.

Various types of signal processing described above can be implemented in digital electronic circuitry, or in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW), flash memory (e.g., SD cards, mini-SD cards, micro-SD cards, etc.), magnetic and/or solid-state hard drives, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multicore processors that execute software, some implementations are performed by one or more integrated circuits, such as application-specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For purposes of the specification, the terms "display" and "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software aspects of the subject disclosure can be implemented as subparts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, or declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation, or the processor being operable to monitor and control the operation. Likewise, a processor configured to execute code can be construed as a processor programmed to execute code or operable to execute code.

A term such as an "aspect" does not imply that such aspect is essential to the subject technology or that such aspect applies to all configurations of the subject technology. A disclosure relating to an aspect may apply to all configurations, or one or more configurations. A term such as "an aspect" may refer to one or more aspects and vice versa. A term such as a "configuration" does not imply that such configuration is essential to the subject technology or that such configuration applies to all configurations of the subject technology. A disclosure relating to a configuration may apply to all configurations, or one or more configurations. A term such as "a configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus comprising:
   a plurality of cavities disposed adjacent to one another in a housing structure;
   a plurality of membranes, each membrane disposed over and configured to seal a cavity of the plurality of cavities; and
   a piezoresistive sensor attached to a respective membrane associated with one of the plurality of cavities and configured to sense a deflection of the respective membrane in response to an applied pressure,
   wherein:
   each membrane of the plurality of membranes is operable within a respective pressure range, and
   the applied pressure is within an operating range of the respective membrane.

2. The apparatus of claim 1, wherein respective pressure ranges of the plurality of membranes are different from one another and cover an overall pressure measurement range of the apparatus.

3. The apparatus of claim 2, wherein the overall pressure measurement range of the apparatus is within 0 kPa to greater than 300 kPa.

4. The apparatus of claim 1, wherein the plurality of cavities comprise a first, a second and a third cavity, and wherein the first, the second and the third cavities are sealed at a first, a second and a third internal pressure, respectively.

5. The apparatus of claim 4, wherein the first, the second and the third internal pressure are within a respective approximate pressure measurement range of a respective membrane associated with the first, the second and the third cavity.

6. The apparatus of claim 5, wherein the first, the second and the third internal pressure comprise 0 kPa, 100 kPa and 200 kPa, and wherein the respective approximate pressure measurement range of the respective membrane associated with the first, the second and the third cavity comprise 0 kPa to 100 kPa, 100 kPa to 200 kPa, and 200 kPa to 300 kPa.

7. The apparatus of claim 6, wherein the respective pressure range of the respective membrane comprises a pressure range that allows the respective membrane to operate in a linear deflection region.

8. The apparatus of claim 1, wherein the piezoresistive sensor is operable over a pressure range within 0 kPa to 300 kPa.

9. The apparatus of claim 1, wherein the plurality of cavities are built in a monolithic semiconductor substrate and the plurality of membranes comprise porous silicon membranes having thicknesses within a range of 2 µm to 100 µm.

10. The apparatus of claim 1, wherein the housing structure comprises a semiconductor substrate in which the plurality of cavities are built, and wherein the plurality of cavities have cavity gap sizes within a range of a few micrometers.

11. An electronic device comprising:
    a multicavity pressure sensor; and
    an electronic circuit;
    wherein the multicavity pressure sensor comprises:
    multiple cavities created in a single substrate;
    multiple membranes, each membrane is operable within a respective pressure range and is disposed over a cavity of the multiple cavities to seal the cavity; and
    a piezoresistive sensor attached to a respective membrane associated with one of the plurality of cavities and configured to sense a deflection of the respective membrane in response to an applied pressure,
    wherein:
    the applied pressure is within a linear region of operation of the respective membrane, and
    the electronic circuit is configured to process pressure signals from the piezoresistive sensor.

12. The electronic device of claim 11, wherein the multiple cavities are sealed at unequal internal pressures.

13. The electronic device of claim 12, wherein the unequal internal pressures are within respective approximate pressure measurement ranges of respective membranes associated with the multiple cavities.

14. The electronic device of claim 12, wherein the unequal internal pressures comprise 0 kPa, 100 kPa and 200 kPa, and wherein the respective approximate pressure measurement ranges of the respective membranes associated with the multiple cavities comprise 0 kPa to 100 kPa, 100 kPa to 200 kPa, and 200 kPa to 300 kPa.

15. The electronic device of claim 11, wherein the multiple cavities are built in a single semiconductor substrate and the multiple membranes comprise porous silicon membranes having thicknesses less than about 100 µm.

16. The electronic device of claim 11, wherein the multiple cavities are built in a single semiconductor substrate and have cavity gap sizes within a range of a few micrometers.

17. The electronic device of claim 11, wherein the piezoresistive sensor is operable over an extended pressure range extending to about 300 kPa.

18. A wireless communication device comprising:
    one or more transducers including a pressure sensor; and
    a processor configured to control operations of the one or more transducers and to process signals from the pressure sensor, the pressure sensor comprising:
    a plurality of cavities disposed adjacent to one another in a semiconductor substrate;
    a plurality of membranes disposed over the plurality of cavities and configured to seal the plurality of cavities; and
    a sensor configured to sense a deflection of a respective membrane associated with one of the plurality of cavities in response to an applied pressure,
    wherein:
    each membrane of the plurality of membranes is operable within a respective linear pressure region, the applied pressure is within the respective linear pressure region of the respective membrane, and the plurality of cavities are sealed at unequal internal pressures.

19. The wireless communication device of claim 18, wherein the sensor comprises one of a capacitive or a piezo-resistive sensor that is operable over an extended pressure range up to about 300 kPa.

20. The wireless communication device of claim 18, wherein the plurality of cavities are built in a single silicon substrate and have cavity gap sizes within a range of a few micrometers, and wherein the plurality of membranes comprise porous silicon membranes having thicknesses less than about 100 μm.

* * * * *